United States Patent [19]
Alliger

[11] 3,768,981
[45] Oct. 30, 1973

[54] AUTO EXHAUST SCRUBBER WITH CATALYST

[76] Inventor: Howard Alliger, 10 Ponderosa Dr., Melville, L. I., N.Y. 11746

[22] Filed: Feb. 16, 1971

[21] Appl. No.: 115,397

[52] U.S. Cl. ............... 23/288 F, 23/284, 55/229, 55/255, 55/256, 55/DIG. 30, 60/310, 261/92, 261/122
[51] Int. Cl. ............................ F01n 3/14, B01j 9/04
[58] Field of Search .................... 55/255, 256, 229, 55/DIG. 30; 23/288 F, 284; 261/92, 122; 60/310; 423/213, 214

[56] References Cited
UNITED STATES PATENTS

| | | | |
|---|---|---|---|
| 1,637,516 | 8/1927 | Brilliant | 55/DIG. 30 |
| 2,138,153 | 11/1938 | Grisdale | 55/255 X |
| 2,602,730 | 7/1952 | Finn | 23/288 F UX |
| 2,677,601 | 5/1954 | Ruth | 55/DIG. 30 |
| 2,849,294 | 8/1958 | Ruth | 23/284 |
| 3,032,968 | 5/1962 | Novak et al. | 55/256 UX |
| 3,216,181 | 11/1965 | Carpenter et al. | 55/256 |
| 3,391,521 | 7/1968 | Pal | 55/256 X |
| 3,566,583 | 3/1971 | Ashmore | 55/255 |

Primary Examiner—Barry S. Richman
Attorney—Kenneth S. Goldfarb

[57] ABSTRACT

A gas scrubber for an internal combustion engine comprising a tank having an intake gas tube to which a composite cylindrical filter formed of a plurality of screens is secured. A clean gas outlet is provided at the top of the tank and a pump is provided in the tank for pumping scrubbing liquid from the interior of the tank back into the filter so that the gas to be scrubbed mixes with the scrubbing liquid and passes through the filter with the scrubbing liquid.

3 Claims, 6 Drawing Figures

PATENTED OCT 30 1973　　　　　　　　3,768,981
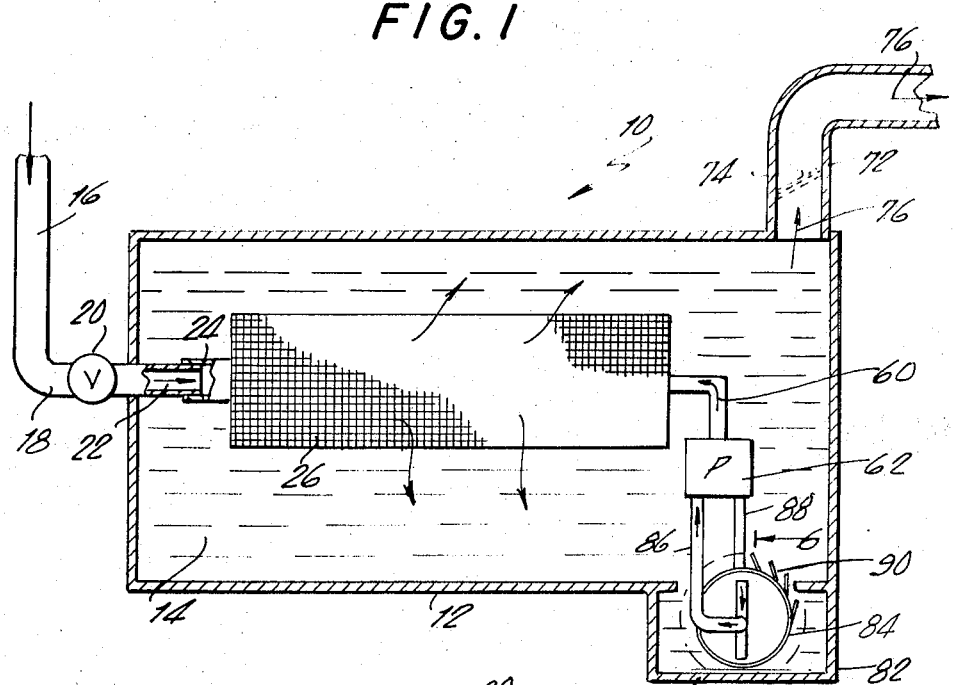
FIG. 1
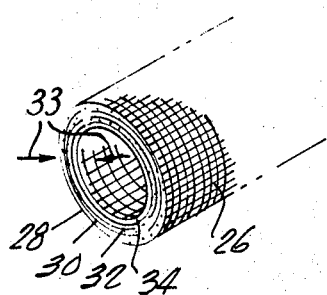
FIG. 2
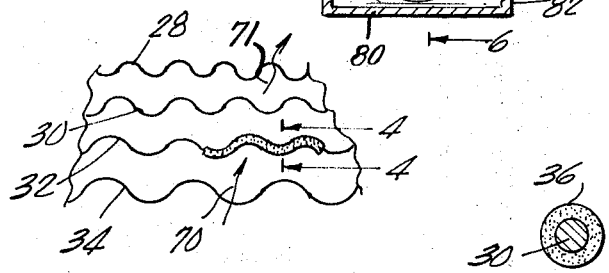
FIG. 3
FIG. 4
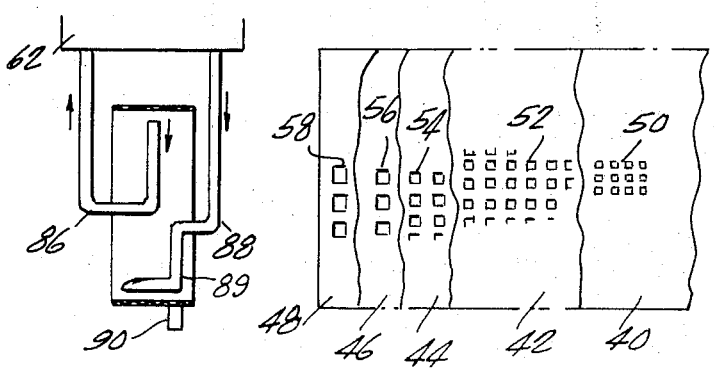
FIG. 5
FIG. 6
INVENTOR.
HOWARD ALLIGER
BY
ATTORNEY

AUTO EXHAUST SCRUBBER WITH CATALYST

This invention relates to an exhaust gas scrubber and more particularly to an apparatus arranged to be mounted on an automotive vehicle for reducing the noxious material emanating from the combustion process of the internal combustion engine.

Various types of automobile exhaust gas scrubbers have been devised in the past which have employed numerous types of filters, sprays, and after-burners for reducing the noxious material emanating as the exhaust residue from combustion of fuel in the internal combustion engine of the automotive vehicles. These prior scrubbers have failed to function without either seriously reducing the efficiency of the automotive vehicle or being so short in effective period of operation as to render the device useless for modern day transportation and driving conditions.

The present invention overcomes the disadvantages of the prior art scrubbers by providing an arrangement wherein a pump operating proportionately to the speed of the internal combustion engine pumps scrubbing liquid from a tank to within a filter so as to enable the scrubbing liquid to mingle and become mixed with the gas to be cleaned, thereby assuring entrapment of the noxious material including lead particles, hydrocarbons and nitrogen and sulphur compounds.

The invention features the employment of a catalyst which functions as the scrubbing liquid and passes with the gas to be cleaned through the mesh of the filter so as to closely contact and effectively chemically change and entrap the noxious material. The catalyst may be finely dispersed in the scrubbing liquid or may be coated on one of the plurality of screens used in the filter. The screens may be of varying mesh.

The catalyst used in the present invention may be platinum, alumina, vanadium pentoxide, or manganese dioxide for oxidizing hydrocarbons and NO to $NO_2$ or CO to $CO_2$. The scrubbing liquid may be an oil or an oil and water emulsion or some other high temperature fluid such as tetraethylene glycol or brake fluid both of which do not start evaporating until 500°F is reached, and can be especially adapted to absorb a great amount of hydrocarbons while lead particles between 0.5 to 50 microns or larger are wet out by the screen network.

Once the lead particles are wet out or removed from the gas stream there is less chance of the catalyst material coming in contact with, or being "poisoned" by, the lead. Of course, once the lead particles are removed in this scrubber, a separate catalyst downstream of the scrubber, should one be used this way, will not come in contact with the lead particles at all. This is one primary use of this scrubber—to protect a catalyst from the lead. If any gaseous lead remains in the exhaust stream, this may be removed by adding alumina, in coating or particle form, within the scrubber. This is an inexpensive way of removing the last trace of lead that might be exhausted.

Still further objects and features of this invention reside in the provision of an automotive gas scrubber which may be utilized with various types of internal combustion engines such as the gasoline or diesel type, such as used on automobiles, buses and trucks.

These, together with the various ancillary objects and features of the present invention, which will become apparent as the following description proceeds, are attained by this auto exhaust scrubber with catalyst, a preferred embodiment of which is illustrated in the accompanying drawings, by way of example only, wherein:

FIG. 1 is a vertical sectional view through a gas scrubber constructed in accordance with the concepts of the present invention;

FIG. 2 is a partial perspective view of a portion of the filter used in connection with the present invention;

FIG. 3 is an enlarged sectional detail view through a portion of the filter showing details of construction thereof;

FIG. 4 is an enlarged transverse sectional view, taken along the plane of line 4—4 in FIG. 3;

FIG. 5 is a view of an alternate type of filter screens used in the invention, and FIG. 6 is a sectional detail view taken along the plane of line 6—6 in FIG. 1.

With continuing reference to the accompanying drawing, wherein like reference numerals designate similar parts throughout the various views, reference numeral 10 is used to generally designate the gas scrubber in accordance with the concepts of the present invention. This gas scrubber is equally adaptable for use with internal combustion engines as well as for use in mines for the purpose of eliminating methane, sulphur dioxide, various nitrogen compounds such as $NO_2$ and the like and various noxious additives, and may likewise be used for cleaning the atmosphere of noxious material during paint, lacquer, or enamel spraying, but is especially useful in reducing pollution from the noxious material exhausted by internal combustion engines. The scrubber 10 includes a tank 12 which may be secured by any suitable brackets, fasteners or the like to frame or chassis of an automotive vehicle and which may have various removable access and fill plates and openings, not shown. The tank 12 contains a scrubbing liquid 14 consisting of any suitable high temperature oil or oil-water emulsion or other high temperature liquid which may contain suitable finely divided catalyst material such as platinum, alumina, vanadium pentoxide, or manganese dioxide particles. Connected to the exhaust manifold 16 of the internal combustion engine is an intake tube 18 having a check valve 20 for permitting flow of gas to be cleaned only in the direction indicated by arrow 22 into the tank 12. The intake tube is connected to a cylindrical intake 24 of a filter 26 which is of a generally cylindrical shape and includes a plurality of screens 28, 30, 32, and 34, which may be of a wire mesh construction. These screens are arranged concentrically and may be secured in such a manner as at 33 so that the screens are compressed tightly together in abutting relationship. As schematically shown in FIG. 3, the screens may be of different size mesh with the screen 28 being of a much finer mesh than the innermost screen 34 and with the screens being of progressively finer mesh as they progress. The screens are arranged in the aubtting relationship to prevent clogging and to produce high "wetting out" ability because of production of many small and intricate paths. Any suitable number of screens may be employed depending upon removal efficiency needed and as shown in FIGS. 3 and 4, one of the screens may have a coating 36 of a catalyst material. As shown in FIG. 5 in lieu of wire mesh screens, screens 40, 42, 44, 46, and 48 can be employed which may be of a perforated metal, plastic or the like wherein the perforations 50, 52, 54, 56 and 58 are of a size which increases inwardly, with the outermost screen 40 having the perforations of the smallest size.

A conduit 60 is secured to the end of the filter 26 opposite the intake tube 22 and a pump 62 is connected thereto, the pump 62 being mounted in the tank by any convenient means and electrically operatively connected to the internal combustion engine in such a manner that the speed of the engine will control the speed of the pump with the pump speed being proportional to the speed of the internal combustion engine. This can be accomplished by placement of mechanisms within the engine much like the present oil pump, or placed on the same belt as the fan or generator. The pump 62 pumps scrubbing liquid from within the tank 12 to within the innermost screen 34 to fill the filter 26 whereby the scrubbing liquid will intimately mingle and mix with the exhaust gas entering in the direction of arrow 22 and thence passing in the direction of arrows 70, 71, as can be seen in FIG. 3, through the filter 26. A clean gas outlet 72 is secured at the top or side of the tank 12 and a suitable screen filter 74 may be disposed in the outlet tube 72 to serve as a demister of the exhaust gas passing in the direction of arrows 76 through the outlet 72, thereby preventing droplets of scrubbing liquid 14 from passing into the clean gas outlet 72. A collection device indicated at 80 is provided and includes an auxiliary tank 82. A wheel 84 of very fine wire mesh or the like is provided and the pump intake is connected to a tube 86 which forms a hollow stub axle for the wheel 84. A small part of the output of the pump 62 is fed through hollow stub axle 88 which blows particles drawn onto the wheel 84 into the auxiliary tank 80. Vanes 90 on the periphery of the wheel 84 move the wheel around by the oil moving out of nozzle 89.

A latitude of modification, substitution and change is intended in the foregoing disclosures, and in some instances, some features of the present invention may be employed without a corresponding use of other features.

I claim:

1. A gas scrubber comprising a tank having an intake gas tube connected thereto and a clean gas outlet connected thereto, a scrubbing liquid in said tank, a filter in said tank connected to said tube, said filter being cylindrical in shape and comprising a plurality of screens arranged concentrically in abutting relationship, pump means in said tank and connected to the interior of said filter for pumping said scrubbing liquid from outside of said filter to within said filter, at least one of said screens having a catalyst coated thereon for chemically changing and entrapping noxious material, and means compressively holding said screens together.

2. A gas scrubber comprising a tank having an intake gas tube connected thereto and a clean gas outlet connected thereto, a scrubbing liquid in said tank, a filter in said tank connected to said tube, said filter being cylindrical in shape and comprising a plurality of screens arranged concentrically in abutting relationship, pump means in said tank and connected to the interior of said filter for pumping said scrubbing liquid from outside of said filter to within said filter, at least one of said screens having a catalyst coated thereon for chemically changing and entrapping noxious material, and means compressively holding said screens together, the outermost of said screens being of a relatively fine mesh, the mesh of the screens increasing inwardly so that the inner screens are increasingly of a coarser mesh with the innermost screen being of the most coarse mesh.

3. A gas scrubber according to claim 2 wherein said scrubbing liquid is an oil or an oil-water emulsion.

* * * * *